United States Patent
Pan

(10) Patent No.: US 7,203,532 B2
(45) Date of Patent: *Apr. 10, 2007

(54) CLAM-SHAPED ELECTRONIC DEVICE AND HINGE MECHANISM THEREOF

(75) Inventor: Long-Jyh Pan, Shijr (TW)

(73) Assignee: Benq Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/350,131

(22) Filed: Feb. 8, 2006

(65) Prior Publication Data

US 2006/0128353 A1    Jun. 15, 2006

Related U.S. Application Data

(63) Continuation of application No. 10/356,992, filed on Feb. 3, 2003, now Pat. No. 7,027,846.

(30) Foreign Application Priority Data

Mar. 29, 2002   (TW) ............................... 91106437 A

(51) Int. Cl.
*H04M 1/00* (2006.01)

(52) U.S. Cl. ................ 455/575.3; 16/330; 16/303; 16/331; 16/334; 16/361; 16/366; 16/371; 379/433; 379/406; 248/284; 248/291; 248/917

(58) Field of Classification Search ............. 455/575.3; 379/433.13; 16/254, 271, 324, 326, 327, 16/333, 342, 345, 352, 362; 361/681–683, 361/801–804; 248/284, 291, 917

See application file for complete search history.

(56) References Cited

U.S. PATENT DOCUMENTS

| 3,955,241 | A | * | 5/1976 | Little ......................... 16/298 |
| 6,141,831 | A | * | 11/2000 | Novin et al. .................. 16/330 |
| 6,208,874 | B1 | * | 3/2001 | Rudisill et al. .......... 455/575.4 |
| 6,256,481 | B1 | | 7/2001 | Jeong et al. .................. 455/90 |
| 6,339,699 | B1 | * | 1/2002 | Hirai et al. ............... 455/575.1 |
| 6,708,046 | B1 | * | 3/2004 | Takagi ..................... 455/575.3 |
| 6,823,067 | B1 | * | 11/2004 | Kubota .................. 379/433.13 |
| 7,027,846 | B2 | * | 4/2006 | Pan ........................ 455/575.3 |
| 2001/0034242 | A1 | * | 10/2001 | Takagi ........................ 455/550 |

* cited by examiner

*Primary Examiner*—Quochien B. Vuong
*Assistant Examiner*—Zhiyu Lu
(74) *Attorney, Agent, or Firm*—Thomas, Kayden, Horstemeyer & Risley

(57) ABSTRACT

A hinge mechanism includes a shaft, a cam, a spring and a sliding member. The shaft has a first end and a second end and the cam is movably disposed at the first end and has an inclined plane facing the second end. Also, the spring is disposed at the second end, and the sliding member is disposed on the shaft and is coupled with the spring. The sliding member moves along the shaft due to the elasticity of the spring. In addition, the sliding member has a contact capable of reaching the inclined plane, wherein the cam on which a force is imposed moves toward the second end so that an elastic potential energy is stored as a result of elastic deformation of the spring and the contact of the sliding member presses the inclined plane to rotate the cam by the spring's resilience.

5 Claims, 12 Drawing Sheets

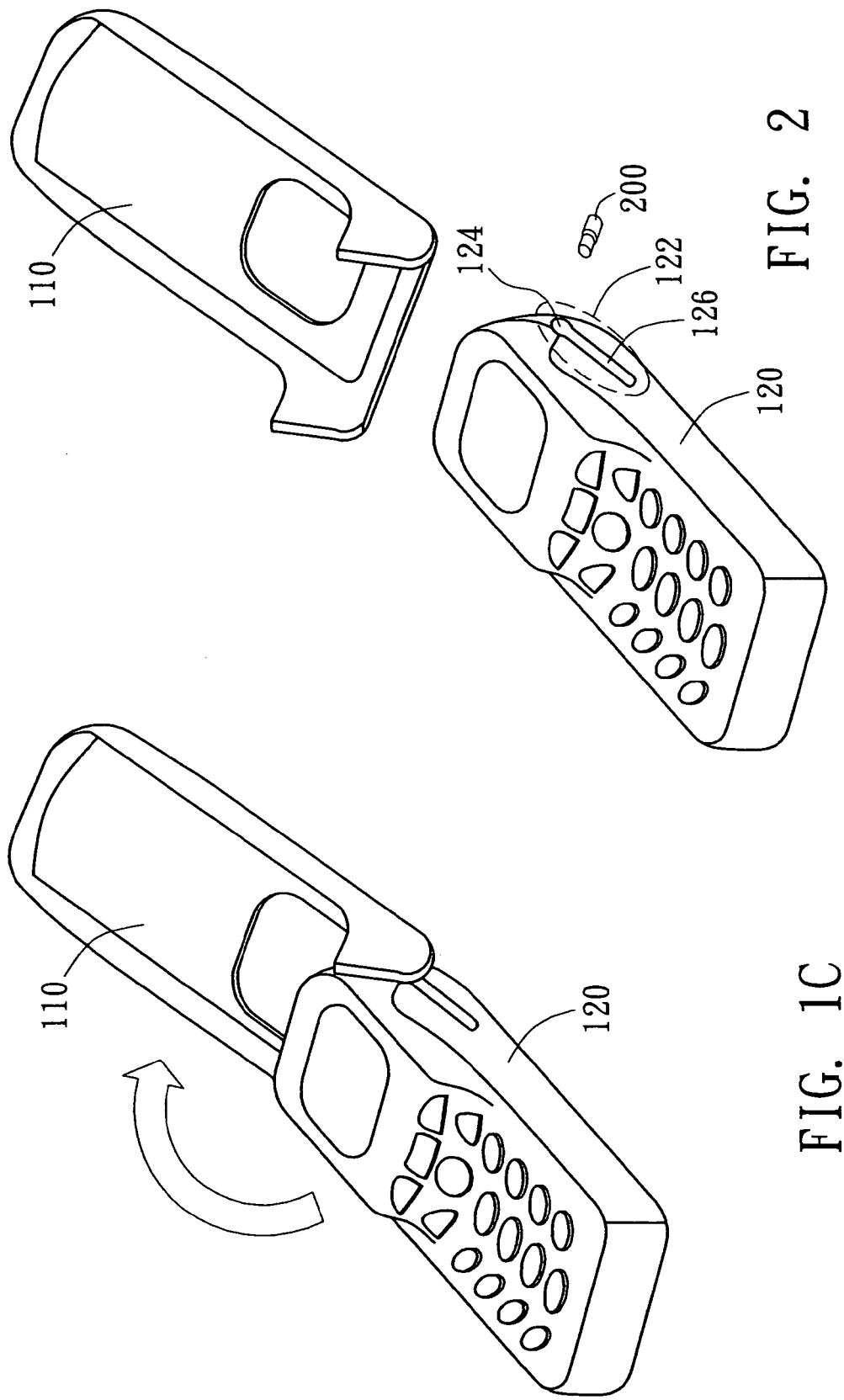

CLAM-SHAPED ELECTRONIC DEVICE AND HINGE MECHANISM THEREOF

CROSS-REFERENCE TO RELATED APPLICATION

This application is a continuation of U.S. patent application Ser. No. 10/356,992, filed Feb. 3, 2003 now U.S. Pat. No. 7,027,846, which claimed the benefit of Taiwan application Serial Number 091,106,437, filed Mar. 29, 2002.

BACKGROUND OF THE INVENTION

1. Field of the Invention

The invention relates in general to a mechanism for holding two components, and more particularly to a hinge mechanism for a two-part electronic device.

2. Description of the Related Art

Various types of compact electronic devices, such as cellular telephones and portable computers, have come into general use with the advances in electronics technology in recent years. These compact devices have covers (henceforth referred to as clam-shaped electronic devices), which can be opened to a specific size to make the device easy to operate when the device is in use, and can be closed when the device is not in use to protect the keypad from inadvertent entries. Additionally, it prevents the screen from being damaged or exposed to dust.

The cellular clam-shaped phone has become in wide demand not only because it has the aforementioned advantages, but also because its cover is adapted to accommodate a variety of distinguished appearances for aesthetic purposes. Please refer to FIG. 1A, which shows a clam-shaped phone when its cover is closed. The clam-shaped phone 100 mainly includes a cover 110 and a main body 120. The cover 110 is horizontally pushed along the direction of arrow sign in FIG. 1B. After a displacement of the cover 110 is made relative to the main body 120, the cover 110 is positioned and then pivotally rotated relative to the main body 120 in the direction of arrow sign in FIG. 1C. It is easy to turn the cover 110 open simply by a push action.

SUMMARY OF THE INVENTION

It is therefore an object of the invention to provide a hinge mechanism for a clam-shaped electronic device so that the hinged cover can be opened when the device is in use and can be closed when the device is not in use to protect the keypad from inadvertent entries and avoid the screen from being damaged or exposed to dust. In addition, it makes the device easy to operate by horizontally pushing the cover with a displacement and then the cover is turned to be opened automatically. Furthermore, the cover is adapted to accommodate a variety of distinguished appearances for aesthetic purposes.

The invention achieves the above-identified objects by further providing an electronic device, comprising: a first housing having a channel, a hinge mechanism disposed within the first housing, and a second housing including a protruding member. The channel comprising a chamber and a sliding slot. The hinge mechanism comprises a shaft, a cam, a spring, and a sliding member. The shaft has a first end and a second end. The cam is movably disposed on the shaft, slidable along the longitudinal axis of the shaft, and rotatable around the shaft when being decoupled with the first end. The spring has a fixing end and a stopping end, and the fixing end is restricted by the second end. The sliding member is disposed between the spring and the cam and slidable along the longitudinal axis of the shaft. The protruding member is slidably received within the channel for being selectively disposed within the chamber of the channel to engage with the cam within the first housing and for being selectively disposed within the sliding slot to release the cam. When the protruding member is disposed in the sliding slot, the spring pushes the sliding member toward the first end to make the cam coupled with the first end and preventing the cam to rotate around the shaft. When the protruding member is disposed in the chamber and engaging with the cam, the protruding member pushes the cam toward the second end so that the cam is decoupled with the first end and rotatable around the shaft.

The invention achieves the above-identified objects by further providing an electronic device, comprising: a first housing having a channel, a hinge mechanism disposed within the first housing, and a second housing including a protruding member. The channel comprising a chamber and a sliding slot. The hinge mechanism comprises a shaft, a cam, a spring, and a sliding member. The shaft has a first end and a second end. The cam is movably disposed on the shaft, slidable along the longitudinal axis of the shaft, and rotatable around the shaft when being decoupled with the first end. The spring has a fixing end and a stopping end, and the fixing end is restricted by the second end. The sliding member is disposed between the spring and the cam and slidable along the longitudinal axis of the shaft. The protruding member is slidably received within the channel for being selectively disposed within the chamber of the channel to engage with the cam within the first housing and for being selectively disposed within the sliding slot to release the cam. When the protruding member is disposed in the sliding slot, the spring pushes the sliding member toward the first end to make the cam coupled with the first end and preventing the cam to rotate around the shaft. When the protruding member is disposed in the chamber and engaging with the cam, the protruding member pushes the cam toward the second end so that the cam is decoupled with the first end and rotatable around the shaft.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 1C is a clam-shaped phone when its cover is rotated to be opened;

FIG. 2 is a clam-shaped phone where its cover is detached from the main body;

DETAILED DESCRIPTION OF THE INVENTION

The hinge mechanism according to the invention facilitates the operation of a clam-shaped electronic device with a hinged cover. The hinged cover may accommodate a variety of distinguished appearances of the clam-shaped electronic device for aesthetic purposes. In current invention, the hinge mechanism pivotally connecting the cover onto the main body makes the clam-shaped electronic device open easily if the user horizontally pushes the cover for a short displacement relative to the main body, then the hinged cover will be raised to become opened automatically. The operation principle for opening the cover with the hinge mechanism of the invention is to rotate the cam along with the cover by the elasticity of the spring from the sliding member, wherein the protruding member on the cover is coupled with the cam for simultaneous rotation. After horizontally pushing the cover relative to the main body, the protruding member on the cover is advanced to impose a force on the cam so that an elastic deformation of the spring is made and an elastic potential energy is released for operation.

Figure 1A:
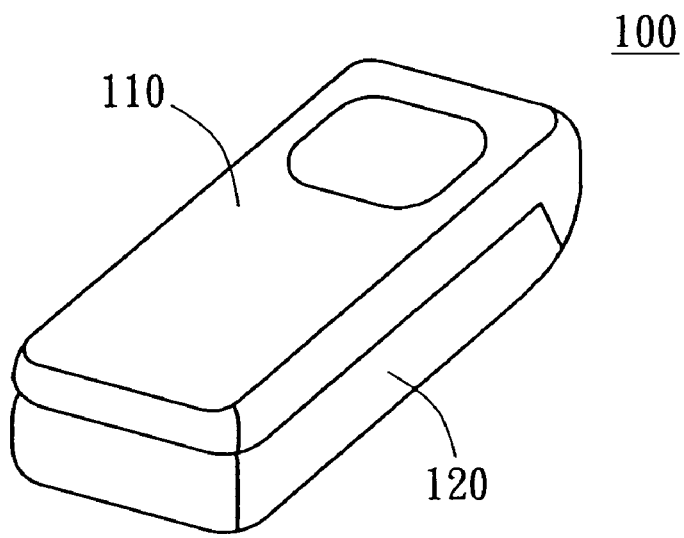
FIG. 1A is a clam-shaped phone when its cover is closed.
Figure 1B:
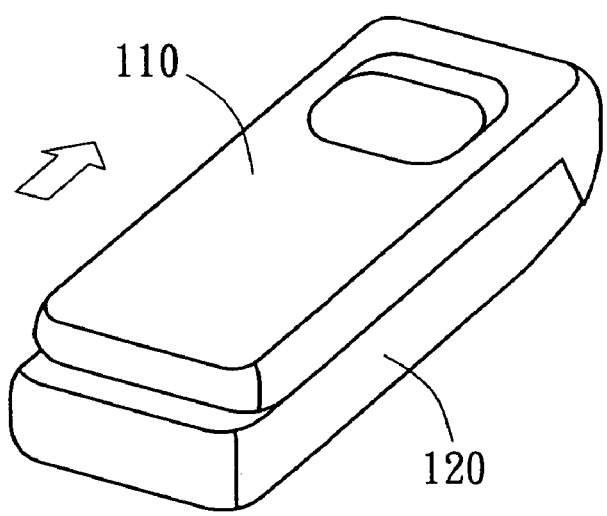
FIG. 1B is a clam-shaped phone when its cover is horizontally pushed.

Referring to FIG. 2, a clam-shaped phone according to the preferred embodiment is shown where the cover 110 of the clam-shaped phone is coupled with the main body 120 by the hinge mechanism 200 disposed within the main body 120. After the assembly process, the cover 110 can be turned to be opened by horizontally pushing the cover with a short displacement relative to the main body 120, as shown in FIG. 1A to FIG. 1C.

Figure 3A:
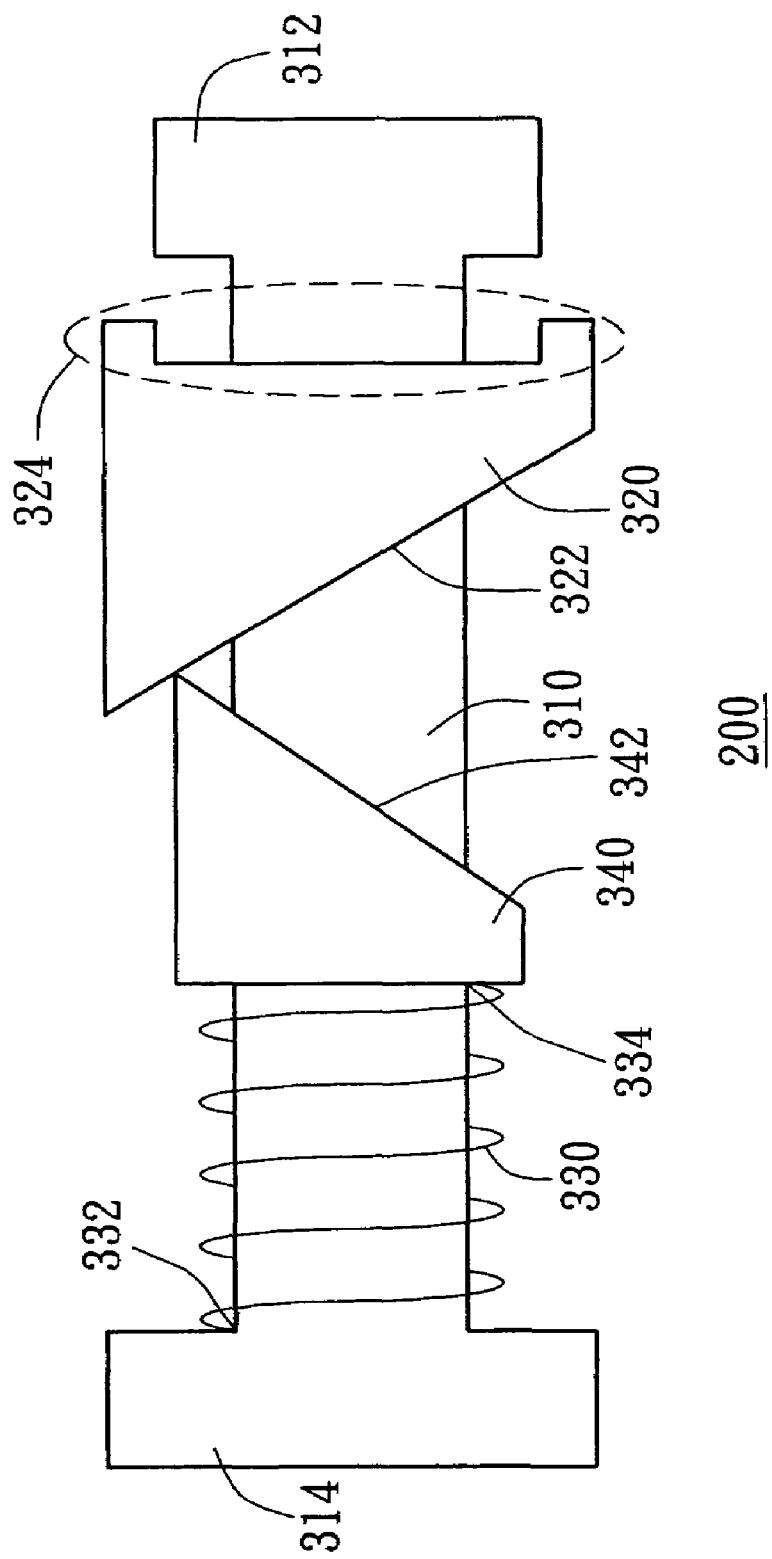
FIG. 3A shows a hinge mechanism according to a preferred embodiment of the invention.

Referring to FIG. 3A, a hinge mechanism according to a preferred embodiment of the invention is shown. The hinge mechanism 200 includes a shaft 310, a cam 320, a spring 330 and a sliding member 340. The shaft 310 has a first end 312 and a second end 314. The cam 320 is movably disposed around the first end 312 of the shaft 310, and slidable along the longitudinal axis of the shaft 310. However, the cam 320 is rotatable around the shaft 310 only when the cam 310 is decoupled with the first end 312. The cam 320 includes a first inclined plane 322 facing the second end 314. The sliding member 340 is disposed on the shaft 310, and coupled with the spring 330. The sliding member 340 is only slidable along the longitudinal axis of the shaft 310, but not rotatable around the longitudinal axis of the shaft 310. One end of the sliding member 340 is coupled with the spring 330 and the other end of the sliding member 340 defines a second inclined plane 342 capable of reaching and stopping the first inclined plane 322. The second inclined plane 342 faces the cam 320 and is in contact with the inclined plane 322. In practice, the shaft 310 can be a stick-like or pin-like structure. The spring 330, sliding member 340, and cam 320 are put on the shaft 310 for moving along the shaft 310 without coming off.

Please refer to FIG. 3A along with FIG. 2. The main body 120 of a clam-shaped electronic device according to the invention has a channel 122 on its lateral surface. The channel 122 includes a chamber 124 and a sliding slot 126. The cover 110 is coupled with the main body 120 by the hinge mechanism 200. The protruding member 410 on the cover 110 is slidably received within the channel 122 for selectively disposed within either the chamber 124 or the sliding slot 126.

The hinge mechanism 200 includes: (a) a shaft 310 having a first end 312 and a second end 314; (b) a cam 320 movably disposed around the first end 312 of the shaft 310, wherein the cam 320 includes (b1) a first inclined plane 322 facing the second end 314 and contacting with the sliding member 340, and (b2) a rib joint 324 facing the first end 312 and dimensioned to be received within the chamber 124; (c) a spring 330 having a fixing end 332 and a stopping end 334, wherein the fixing end 332 is restricted by the second end 314; and (d) a sliding member 340 having a second inclined plane 342 facing the cam 320, wherein the sliding member 340 is slidable along the longitudinal axis of the shaft 310, disposed between the stopping end 334 and the cam 320. When the rib 410 is disposed in the sliding slot 126, the rib 410 releases the rib joint 324 and then the spring 330 pushes the sliding member 340 toward the first end 312 to make the cam 320 coupled with the first end 320 and prevent the cam 320 to rotate around the shaft 310.

When the rib 410 is disposed in the chamber 124, the rib 410 engages with the rib joint 324 and then the rib 410 pushes the cam 320 move toward the second end 314 so that the cam is decoupled with the first end 312 and become rotatable around the shaft 310. Without applying further external force, the second inclined plane 342 transfers the resilient force provided by the spring 330 onto the first inclined plane 322 of the cam 320, then the rotated cam 320 will raise the cover 110 to become opened.

Figure 3B:
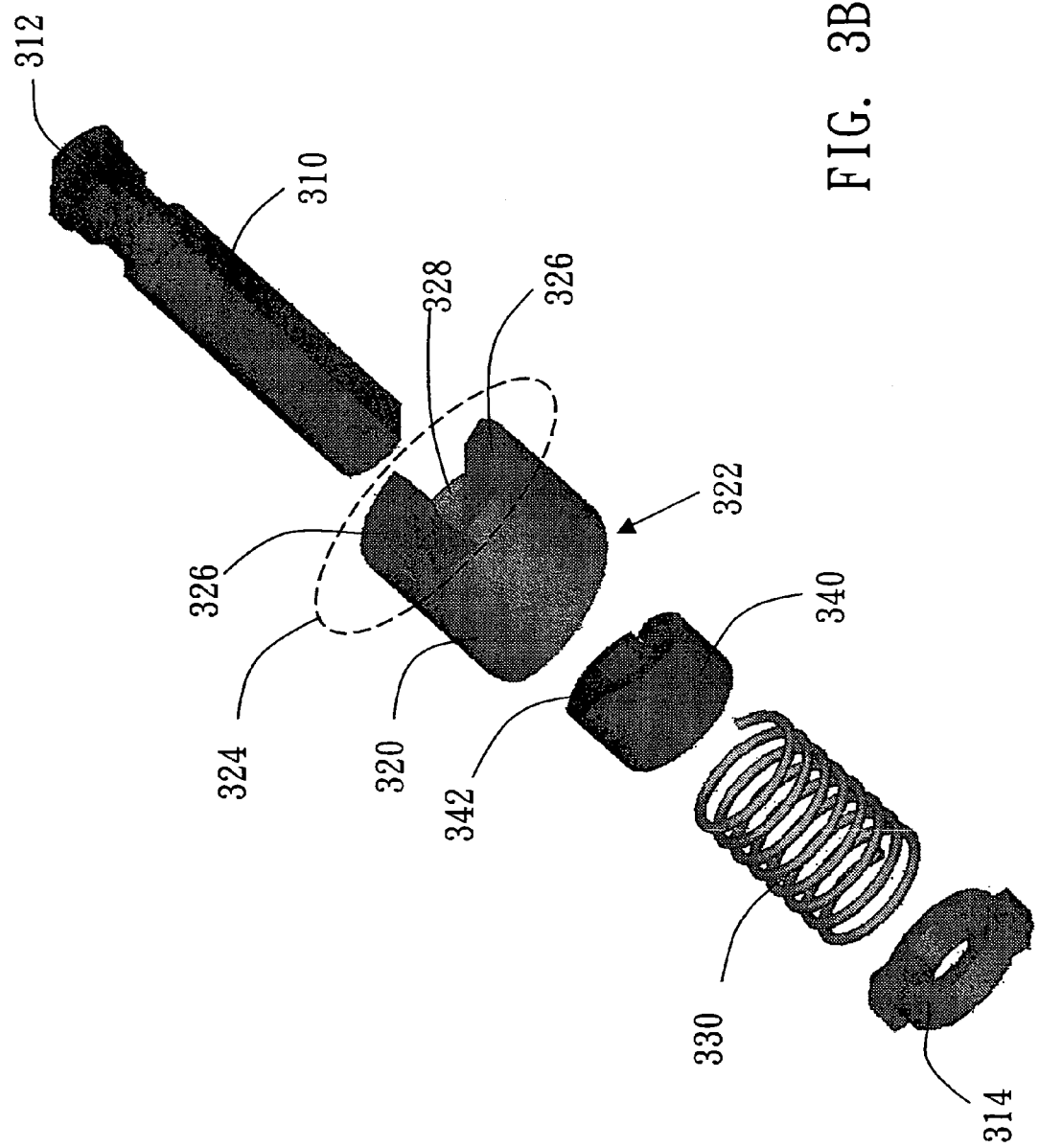
FIG. 3B shows an exploded view of the hinge mechanism according to a preferred embodiment of the invention.

Referring to FIG. 3B, an exploded view of the hinge mechanism according to a preferred embodiment of the invention is shown. The components of the hinge mechanism structure include a shaft 310 with a first end 312 and a second end 314, a cam 320, a first inclined plane 322, a rib joint 324, an annular flange 326, a spring 330, a sliding member 340, and a second inclined plane 342.

Figure 3D:
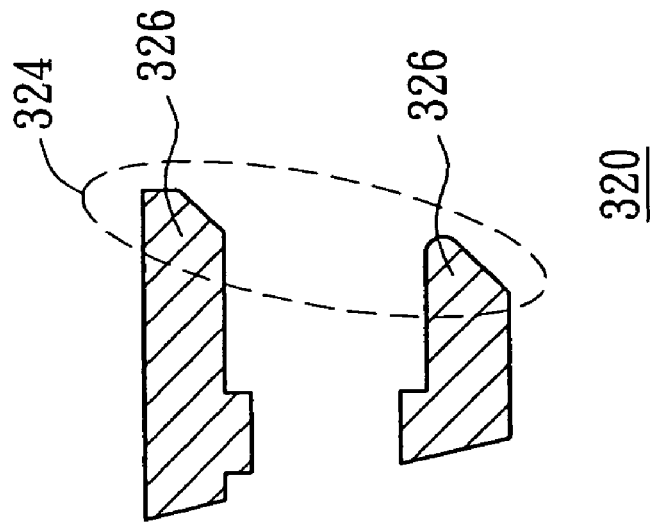
FIG. 3D is a cross-sectional view of the cam taken on line 3D—3D of FIG. 3C.
Figure 3C:
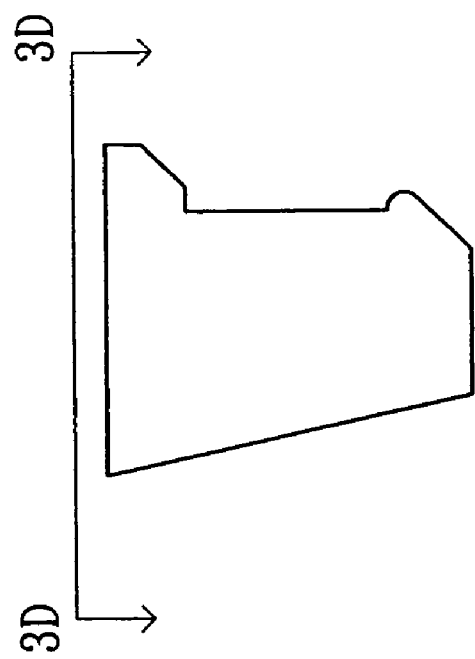
FIG. 3C is a lateral view of the cam in FIG. 3B.

Referring to FIG. 3C and FIG. 3D, FIG. 3C is a lateral view of the cam in FIG. 3B and FIG. 3D is a cross-sectional view of the cam taken on line 3D—3D of FIG. 3C. As shown in FIG. 3D, the cam 320 includes a rib joint 324 having an annular flange 326.

Figure 3E:
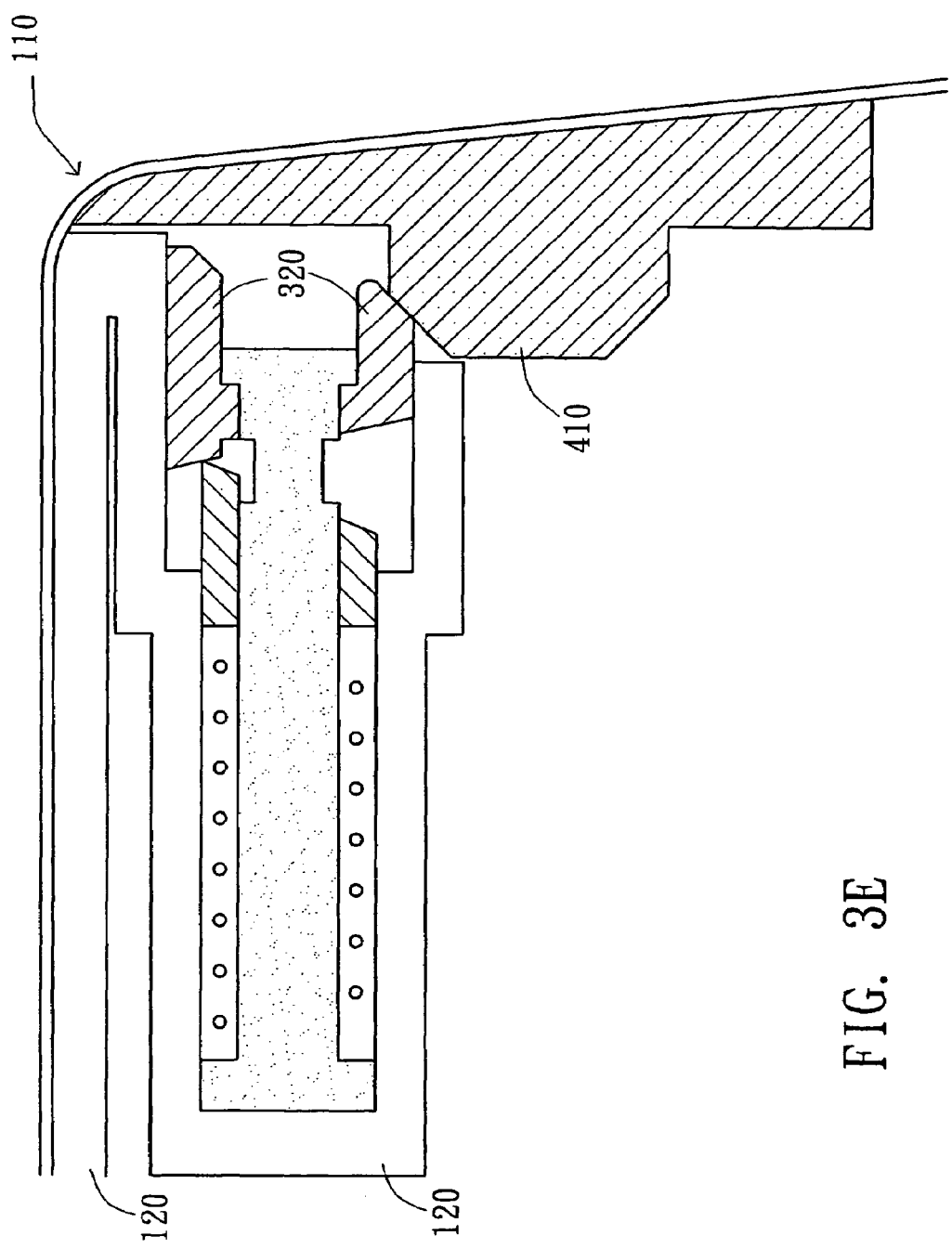
FIG. 3E is a cross-sectional view of the hinge mechanism in FIG. 3A installed in a clam-shaped phone.

Referring to FIG. 3E, a cross-sectional view of the hinge mechanism in FIG. 3A installed in a clam-shaped phone is shown. The hinge mechanism 200 couples the cover 110 onto the main body 120 of the clam-shaped phone. The rib 410 disposed on the cover 110 has an incline design matching the incline design of the rib joint 324.

Figure 4A:
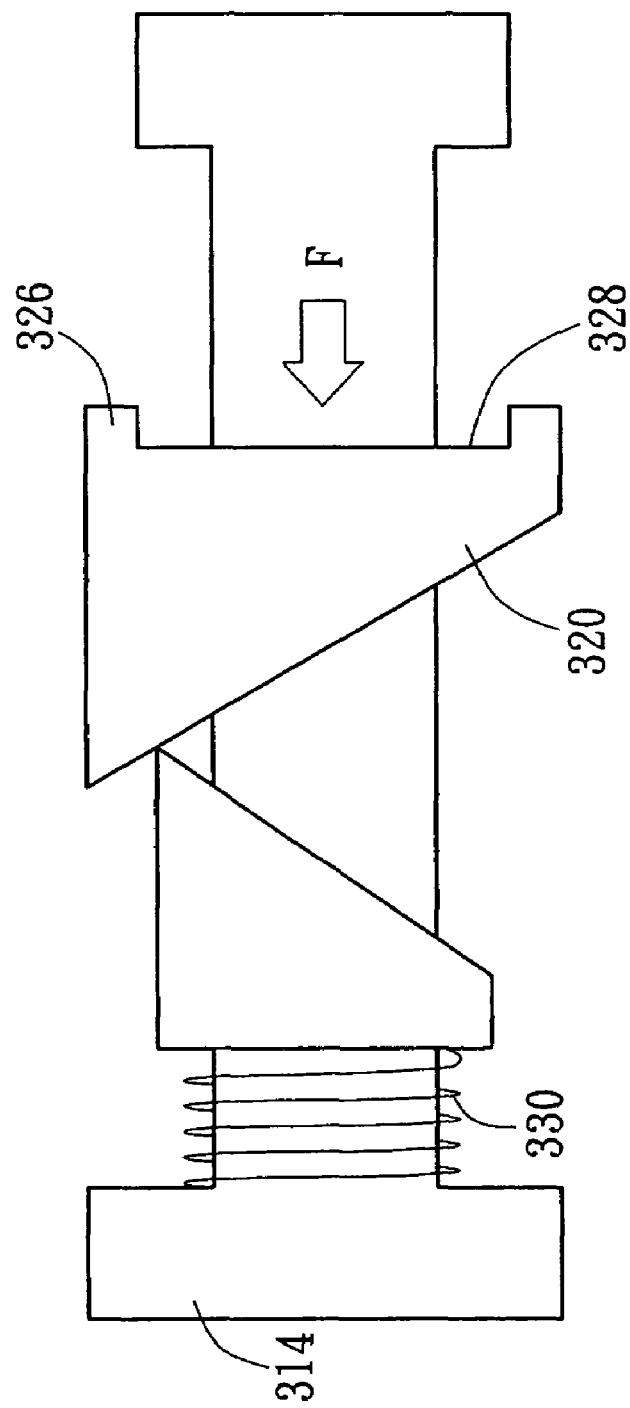
FIG. 4A shows a hinge mechanism in the first operational step according to a preferred embodiment of the invention.

Referring to FIG. 4A, a hinge mechanism in the first operational step according to a preferred embodiment of the invention is shown. As shown in FIG. 4A, the cam 320 moves toward the second end 314 by force F and then an elastic potential energy is stored as a result of the elastic deformation of the spring 330.

Figure 4B:
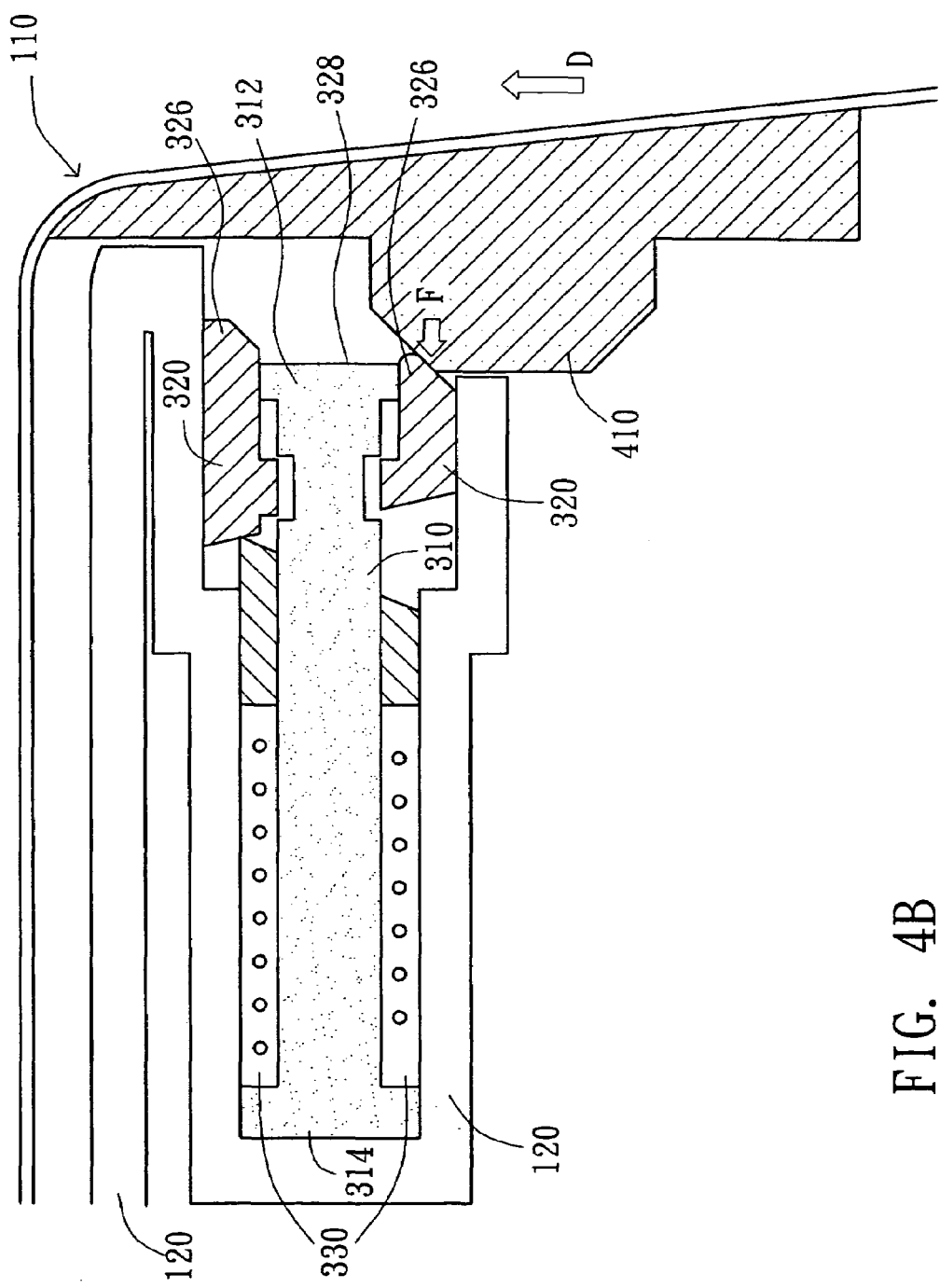
FIG. 4B is a cross-sectional view of the hinge mechanism in FIG. 4A installed in a clam-shaped phone.

Referring to FIG. 4B, a cross-sectional view of the hinge mechanism in FIG. 4A installed in a clam-shaped phone is shown. As shown in FIG. 4B, the displacement of the cover 110 is made relative to the main body 120 in the direction D so that the rib 410 on the cover 110 imposes a force on the cam 320, and then the cam 320 moves toward the second end 314 for compressing the spring 330. Therefore, the elastic potential energy is generated due to the elastic deformation of the spring 330.

The rib joint 324 includes an annular flange 326 and has a narrow cut 328 located inside the annular flange 326. The rib 410 on the cover 110 can be bar-shaped. As the rib 410 moves from the sliding slot 126 to chamber 124, the rib 410 imposes a force on the annular flange 326 so that the cam 320 moves toward the second end 314 to compress the spring 330, and then the rib 410 moves inside the annular flange 326 and may contact with the narrow cut 328 so that the cover 110 is coupled with the cam 320 for simultaneous rotation. Meanwhile, the elastic potential energy of the spring 330 is released and the cam 320 slightly moves toward the first end 312 and rotates around the shaft 310 to open the cover 110.

Figure 5A:
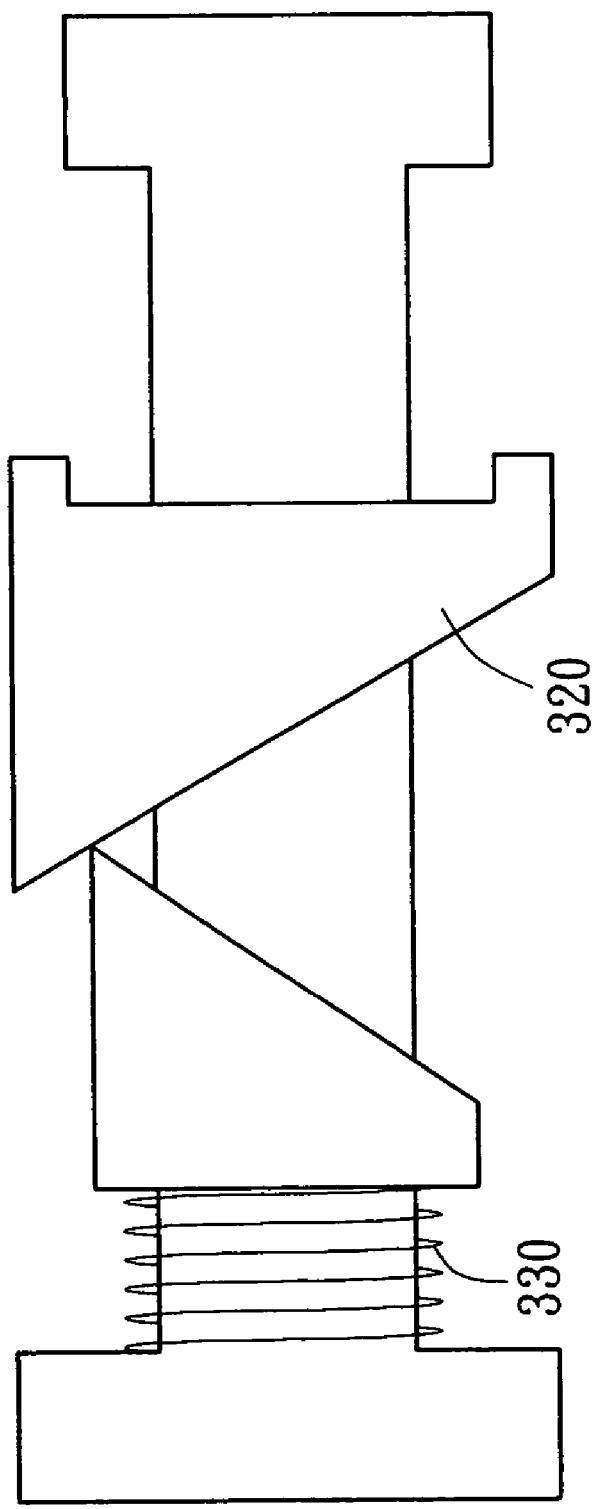
FIG. 5A shows a hinge mechanism in the second operational step according to a preferred embodiment of the invention.

Referring to FIG. 5A, a hinge mechanism in the second operational step according to a preferred embodiment of the invention is shown. The cam 320 in FIG. 5A is positioned and will start to rotate around the shaft 310. In the second operational step, the elastic potential energy of the spring 330 is maximized waiting for being released.

Figure 5B:
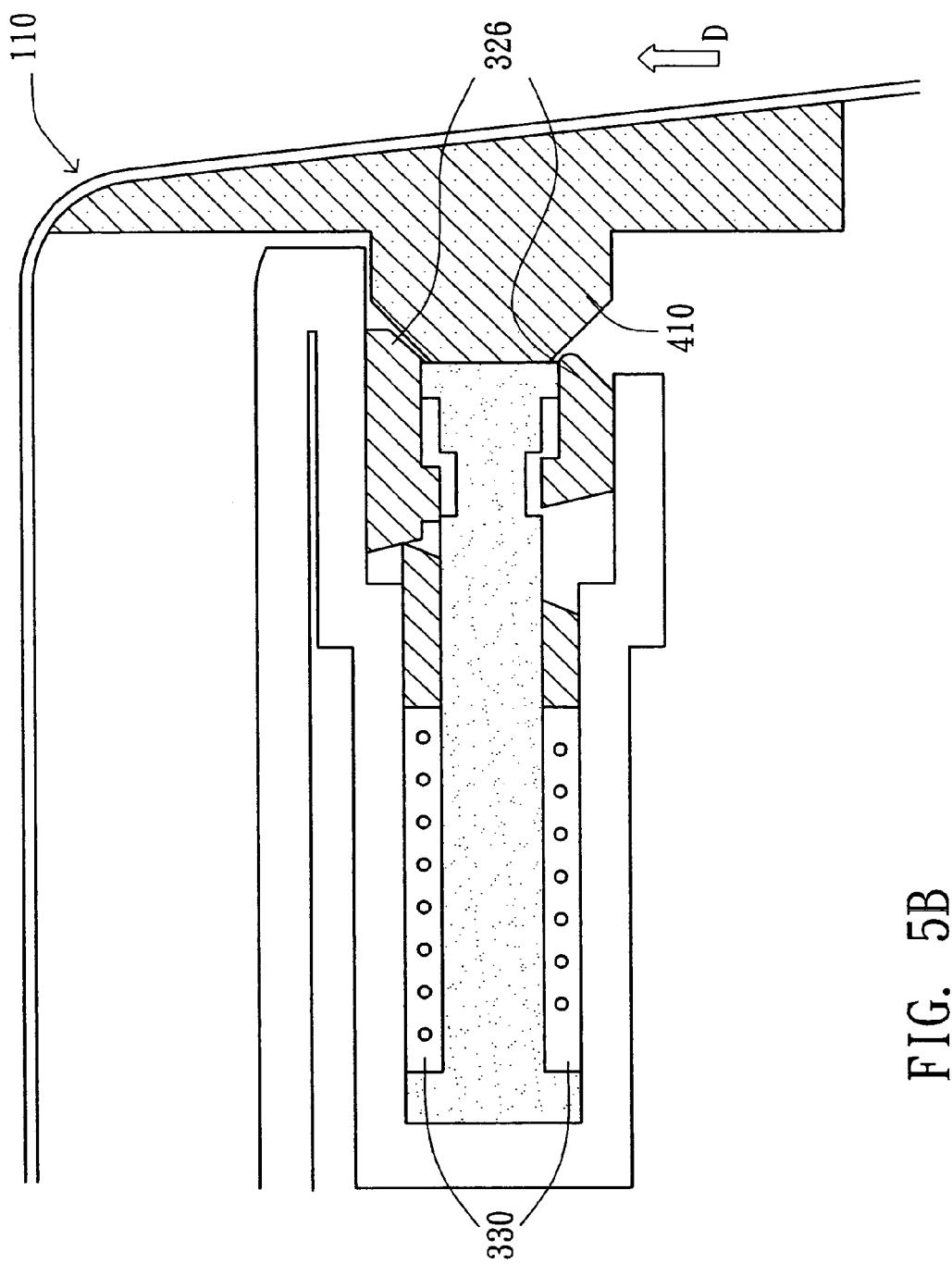
FIG. 5B is a cross-sectional view of the hinge mechanism in FIG. 5A installed in a clam-shaped phone.

Referring to FIG. 5B, a cross-sectional view of the hinge mechanism in FIG. 5A installed in a clam-shaped phone is shown. The cover 110 is further horizontally pushed relative to the main body 120 in the direction D. When the rib 410 moves entirely inside the annular flange 326, the elastic deformation of the spring 330 is maximized and the cover 110 is ready to be opened.

Figure 6A:
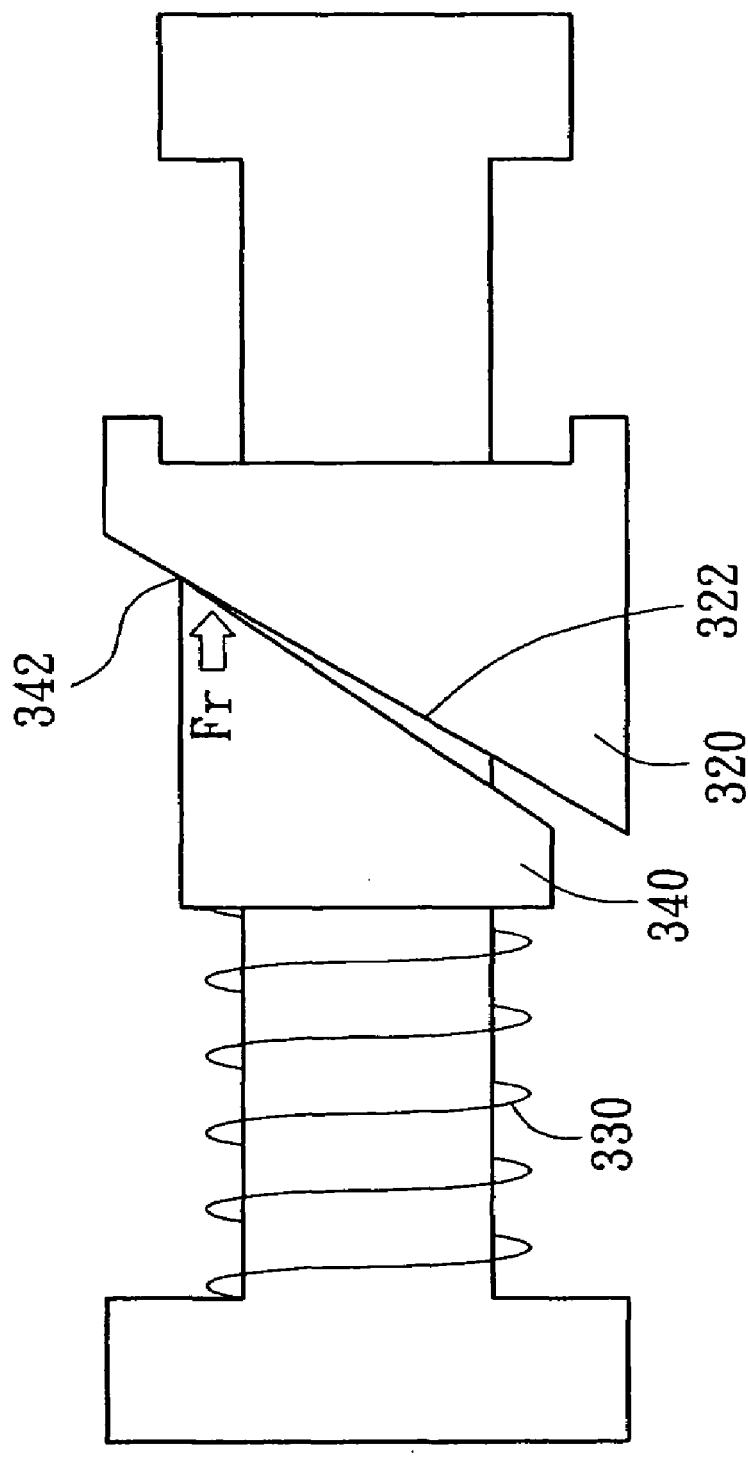
FIG. 6A shows a hinge mechanism in the third operational step according to a preferred embodiment of the invention.

Referring to FIG. 6A, a hinge mechanism in the third operational step according to a preferred embodiment of the invention is shown. Without applying further external force, the cam rotates around the shaft 310 since the second inclined plane 342 transfers a resilient force Fr onto the first inclined plane 322 due to the release of the elastic potential energy provided by the spring 330. In addition, the rib 410 engages with the rib joint 324 and therefore the cam 320 does not move along the shaft 310 but rotates around the shaft 310.

Figure 6B:
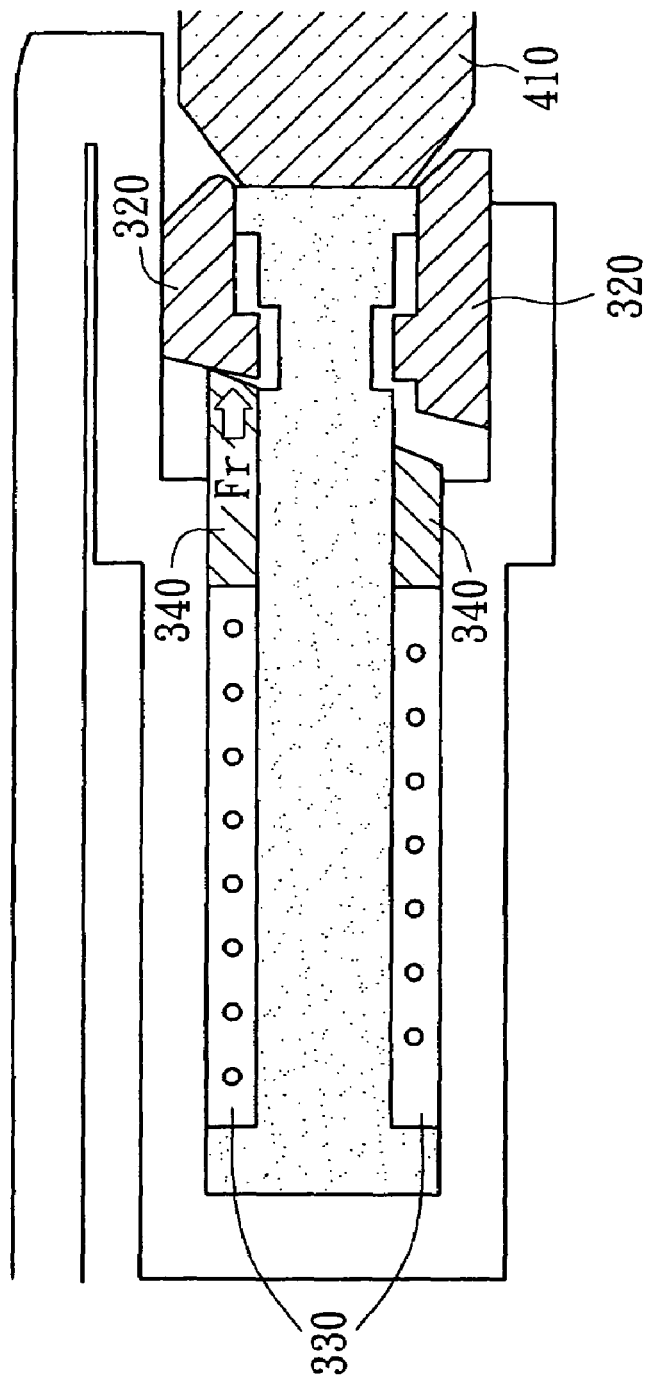
FIG. 6B is a cross-sectional view of the hinge mechanism in FIG. 6A installed in a clam-shaped phone.

Referring to FIG. 6B, a cross-sectional view of the hinge mechanism in FIG. 6A installed in a clam-shaped phone is shown. The sliding member 340 transfers the resilient force Fr onto the cam 320 due to the release of the elastic potential energy provided by the spring 330. The cam 320 coupled with the rib 410 rotates around the shaft 310 and the cover 110 along with the rib 410 rotates accordingly.

The geometric shape of each component of the invention can be changed to cover various modifications for performing similar functions. For example, the protruding member can have a rib joint instead while the rib can be formed on the cam. Thus, the annular flange of the rib joint will conversely impose a force on the rib so as to move the cam and press the spring. The hinge mechanism according to the preferred embodiment of the invention, at least, has the following advantages:

1. The hinge mechanism is used for coupling the cover and the main body of a clam-shaped phone so that the hinged cover can be opened when the device is in use and can be closed when the device is not in use, to protect the keypad from inadvertent entries and avoid the screen from being damaged or exposed to dust.

2. The hinge mechanism makes the clam-shaped phone easy to operate by horizontally pushing the cover for a displacement and then the cover is turned relative to the main body and becomes opened automatically.

3. The way to open the cover is distinctive and the cover is adapted to accommodate a variety of distinguished appearances for aesthetic purposes.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
   a first housing having a channel, the channel comprising a chamber and a sliding slot;
   a hinge mechanism disposed within the first housing, comprising:
      a shaft having a first end and a second end;
         a cam movably disposed on the shaft, the cam being slidable along the longitudinal axis of the shaft, and the cam being rotatable around the shaft when the cam being decoupled with the first end;
         a spring having a fixing end and a stopping end, the fixing end being restricted by the second end; and
         a sliding member disposed between the spring and the cam, the slidable member being slidable along the longitudinal axis of the shaft; and
   a second housing comprising a protruding member, the protruding member being slidably received within the channel for being selectively disposed within the chamber of the channel to engage with the cam within the first housing and for being selectively disposed within the sliding slot to release the cam;
   wherein when the protruding member is disposed in the sliding slot, the spring pushes the sliding member toward the first end to make the cam coupled with the first end and preventing the cam to rotate around the shaft;
   wherein when the protruding member is disposed in the chamber and engaging with the cam, the protruding member pushes the cam toward the second end so that the cam is decoupled with the first end and rotatable around the shaft.

2. The electronic device according to claim 1, wherein the cam comprises a rib formed thereon, and the rib is dimensioned to be received within the chamber.

3. The electronic device according to claim 2, wherein the protruding member has a rib joint.

4. The electronic device according to claim 1, wherein the cam comprises a first inclined plane facing the sliding member and the sliding member further comprises a second inclined plane facing the cam, and wherein the cam decoupled with the first end rotates around the shaft since the second inclined plane transfers a resilient force provided by the spring on to the first inclined plane.

5. The electronic device according to claim 3, wherein the rib joint comprises an annular flange and has a narrow cut, wherein (a) the annular flange imposes a force on the rib so that the cam moves toward the second end and presses the spring, and (b) then the rib gets inside the annular flange and joints the narrow cut so that the second housing is coupled with the cam for rotation simultaneously.

* * * * *